(12) United States Patent  
Radtke et al.

(10) Patent No.: US 7,566,868 B2  
(45) Date of Patent: *Jul. 28, 2009

(54) SHIELDED PADS FOR DETECTING SUBSURFACE RADIATION PHENOMENA

(75) Inventors: Richard J. Radtke, Pearland, TX (US); Arlene O. Siefker-Radtke, Pearland, TX (US); Christian Stoller, Kingwood, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/968,696

(22) Filed: Jan. 3, 2008

(65) Prior Publication Data

US 2008/0105821 A1 May 8, 2008

Related U.S. Application Data

(63) Continuation of application No. 10/906,562, filed on Feb. 24, 2005, now Pat. No. 7,339,161.

(51) Int. Cl.
*G01V 5/04* (2006.01)
(52) U.S. Cl. ...................................... 250/268
(58) Field of Classification Search ........... 250/368, 250/268
See application file for complete search history.

(56) References Cited

U.S. PATENT DOCUMENTS

| | | | |
|---|---|---|---|
| 2,957,990 A | 10/1960 | Newton et al. |
| 3,103,588 A | 9/1963 | Shevick |
| 3,147,378 A | 9/1964 | Hall, Jr. |
| 3,281,599 A | 10/1966 | Baker et al. |
| 3,321,625 A | 5/1967 | Wahl |
| 3,521,064 A | 7/1970 | Moran et al. |
| 3,566,682 A | 3/1971 | Winkler, Jr. |
| 3,608,373 A | 9/1971 | Youmans |
| 3,990,297 A | 11/1976 | Pelet et al. |
| 4,047,027 A | 9/1977 | Bateman et al. |
| 4,048,495 A | 9/1977 | Ellis |
| 4,129,777 A | 12/1978 | Wahl et al. |
| 4,297,575 A | 10/1981 | Smith, Jr. et al. |
| 4,423,323 A | 12/1983 | Ellis et al. |

(Continued)

OTHER PUBLICATIONS

Tittman, J. et al., The Sidewall Epithermal Neutron Porosity Log, Journal of Petroleum Technology, Oct. 1966, pp. 1351-1362.

*Primary Examiner*—David P Porta
*Assistant Examiner*—Marcus H Taningco
(74) *Attorney, Agent, or Firm*—Darla P. Fonseca; Jaime Castano; Dale Gaudier

(57) ABSTRACT

Apparatus and method for detecting subsurface radiation phenomena. An elongated support member, adapted for disposal within a wellbore traversing a subsurface formation, includes a recess along its longitudinal axis. A pad is linked to the support member. The pad is configured with a surface correspondingly shaped to fit in juxtaposition with the support member recess. The pad is adapted for movement into and out of the recess such that an exposed surface of the pad can extend away from the support member. The pad also includes one or more radiation detectors and is adapted with shielding material on its sides near the exposed surface to prevent radiation reflected from the recess from reaching the detector(s) from the area near the exposed surface.

23 Claims, 3 Drawing Sheets

U.S. PATENT DOCUMENTS

| | | |
|---|---|---|
| 4,645,926 A | 2/1987 | Randall |
| 4,661,700 A | 4/1987 | Holenka |
| 4,691,102 A | 9/1987 | Schultz et al. |
| 4,972,082 A | 11/1990 | Loomis et al. |
| 5,051,581 A | 9/1991 | Hertzog et al. |
| 5,349,184 A | 9/1994 | Wraight |
| 5,390,115 A | 2/1995 | Case et al. |
| 5,508,514 A | 4/1996 | Sallwasser et al. |
| 5,528,029 A | 6/1996 | Chapellat et al. |
| 5,528,556 A | 6/1996 | Seeman et al. |
| 5,530,243 A | 6/1996 | Mathis |
| 5,596,142 A | 1/1997 | Delpuech et al. |
| 5,659,169 A | 8/1997 | Mickael et al. |
| 6,065,218 A | 5/2000 | Edwards |
| 6,308,561 B1 | 10/2001 | Samworth et al. |
| 6,376,838 B1 | 4/2002 | Odom |
| 6,909,969 B2 | 6/2005 | Calvert et al. |

SHIELDED PADS FOR DETECTING SUBSURFACE RADIATION PHENOMENA

BACKGROUND OF INVENTION

1. Field of the Invention

This invention relates to downhole apparatus for determining the properties of subsurface formations. More particularly, the invention relates to methods and apparatus for detecting subsurface radiation phenomena.

2. Description of Related Art

The characteristics of geological formations are of significant interest in the exploration for and production of subsurface water and mineral deposits, such as oil and gas. Many characteristics, such as the hydrocarbon volume, porosity, lithology, and permeability of a formation, may be deduced from certain measurable quantities. Among these quantities are: density, neutron porosity, photoelectric factor (Pe), hydrogen index, salinity, and thermal neutron capture cross section (Sigma). The quantities are typically measured by logging-while-drilling (LWD) and wireline tools. A typical tool carries a source that radiates/emits energy into the formation and one or more detectors that sense the resulting interaction of the radiation. Detected signal data is typically transmitted uphole, temporarily stored downhole for later processing, or combined in both techniques, to evaluate the geological formation from which the data was gathered.

Of the many quantities of interest in exploration for and production of hydrocarbons, the density and photoelectric factor of the formations are two of the most important. These quantities are generally measured with a tool containing a source of gamma rays and at least one gamma-ray detector (See, e.g., U.S. Pat. Nos. 5,390,115, 5,596,142, 6,376,838, 5,528,029, 4,691,102). The depth of investigation of this measurement is relatively shallow, on the order of a few centimeters. Consequently, the measurement is sensitive to the environment near the tool body. In particular, borehole fluid (mud) or mud cake interposed between the tool and the formation degrades the accuracy of the measurement.

To reduce these environmental effects, the source and gamma-ray detector(s) are typically heavily shielded and collimated. Additionally, two gamma-ray detectors are also commonly disposed in the tool. The detector further from the source is generally used to obtain the primary density measurement and the one nearer to the source a correction for near-tool effects. For radiation-type tools conveyed through the formation on a drill pipe, these techniques are essentially all that can be applied to improve the accuracy of the measurement.

However, an additional technique for minimizing the separation between tool and formation is available for tools conveyed through the formation via wireline, slickline, coiled tubing, tractors, or through drill pipe. This technique is shown in FIG. 1A. In it, a source 5 (e.g., a gamma-ray source) and one or more detectors 12 are place in a pad 14. This pad 14 is typically connected by a hinged joint to the support member or main body 16 of the tool 10 as known in the art. Mechanical and electrical support for the pad 14 is provided by the tool body, which in the region of the pad may be referred to as the "C-housing" recess 20 due to its cross sectional shape (See FIG. 2A). A biasing or back-up arm 18 is attached to the back of the pad 14 in order to force it away from the main body 16 and into contact with the formation 22.

As shown in FIGS. 1A and 1B, in the logging operation, the back-up arm 18 forces the exposed surface 24 of the pad 14 into contact with the borehole 26 wall. In FIG. 1A, the borehole 26 is smooth and the pad 14 is inside the recess 20. In FIG. 1B, the borehole 26 is washed-out and the pad 14 is extended from the recess 20.

This arrangement allows the source 5 and detector(s) 12 to remain close to the formation 22 under a variety of conditions. In a smooth borehole 26 with no mud cake (FIGS. 1A and 2A), the pad 14 is in contact with the formation 22 and is seated inside the recess 20. In washed-out or rugose boreholes 26 (FIGS. 1B and 2B), the pad 14 is still in contact with the formation 22, but it is now extended from the recess 20. Had the detector(s) 12 been encased in the tool body 16, there would be a considerable amount of borehole mud between the tool 10 and the formation 22 in this situation, potentially degrading the accuracy of the measurement.

While the use of a pad-based tool reduces the difficulty of maintaining good tool-formation contact in non-ideal situations, it presents a potential problem. Formation density and Pe are typically measured by monitoring the changes in the number and distribution of detected gamma rays under the assumption that these changes arise only from changes in the formation or mud properties or from standoff between the tool and borehole wall. Comparing FIGS. 2A and 2B, another effect that may cause a variation in the detected radiation is the position of the pad 14 relative to the recess 20. This position changes dynamically as the well is logged due not only to washouts and rugosity, but also to the precise articulation and method of conveyance of the tool and to the trajectory of the borehole. If the effect is large and uncorrected, it will introduce error into the measurement.

This error is likely larger when less-dense borehole fluids are involved. The radiation that interacts with the recess at some point during travel from the source 5 to the detector 12 gives rise to the sensitivity of the measurement to the recess 20 position. These gamma rays must necessarily pass through the borehole 26 to reach the recess 20. Greater attenuation is likely in boreholes filled with denser fluids compared to less dense fluids, and hence this recess effect will generally be larger in the latter case. In particular, operating pad-based radiation-sensitive measurement tools in air-filled boreholes may be especially prone to this problem.

Earlier generation nuclear-type logging tools have used massive amounts of shielding. The intent of this shielding has been to restrict the detected radiation (e.g. gamma rays) to that which travels mainly in the formation near the line of closest approach between the tool and the formation. The result is a measurement that is more focused and less sensitive to borehole diameter and borehole fluid.

These conventional shielding techniques work for their intended purpose, but with several drawbacks. In order to effectively attenuate undesired radiation, shielding materials must contain elements with high atomic numbers and high densities. Moreover, the energies of the radiation involved and the sensitivity of the measurement require that the shielding be very thick. These shielding materials are also difficult to form and to machine, and few vendors are willing to do so. These features combine to create tools which are large, heavy, and expensive.

Conventional downhole tools, on the other hand, are often expected to be small, light, and inexpensive. Under these conditions, the space available for shielding is much more restricted. The measurement is necessarily less focused and sensitivity of the measurement to recess position can be expected to occur unless additional steps are taken. Nuclear modeling calculations can confirm this. For example, for a pad in an air-filled borehole, the apparent density can change by ~0.1 $g/cm^3$ with the relative position of pad and recess, about ten times larger than a desired accuracy of ~0.01 $g/cm^3$.

Thus a need remains for improved shielding techniques in radiation-type tools in order to reduce undesired effects on the measurements.

SUMMARY OF INVENTION

The invention provides an apparatus for detecting subsurface radiation phenomena. The apparatus comprising an elongated support member adapted for disposal within a wellbore traversing a subsurface formation; the support member having a recess along its longitudinal axis; a pad linked to the support member, the pad having a surface correspondingly shaped to fit in juxtaposition with the recess in the support member; the pad adapted for movement into and out of the recess such that an exposed surface of the pad can extend away from the support member; at least one radiation detector disposed within the pad; and the pad adapted with shielding material on its sides near the exposed surface to prevent radiation reflected from the recess from reaching the at least one detector from the area near the exposed surface.

The invention provides an apparatus for detecting subsurface radiation phenomena. The apparatus comprising an elongated support member adapted for disposal within a wellbore traversing a subsurface formation; the support member having a C-shaped recess formed along its longitudinal axis; a pad linked to the support member, the pad having a rounded surface correspondingly shaped to fit in juxtaposition with the C-shaped recess in the support member; the pad adapted for movement into and out of the recess such that an exposed surface of the pad can extend away from the support member; at least one radiation detector disposed within the pad; and the pad adapted with shielding material on its sides near the exposed surface to prevent radiation reflected from the recess from reaching the at least one detector from the area near the exposed surface.

The invention provides a method for detecting subsurface radiation phenomena. The method comprises disposing an elongated support member within a wellbore traversing a subsurface formation, the support member having a recess along its longitudinal axis and a pad linked thereto, the pad having a surface correspondingly shaped to fit in juxtaposition with the recess and a surface exposed to the wellbore, the pad having at least one radiation detector disposed thereon and adapted with shielding material on its sides near the exposed surface to prevent radiation reflected from the recess from reaching the at least one detector from the area near the exposed surface; activating the pad to move in and out of the recess to position the exposed surface of the pad within the wellbore; and detecting radiation phenomena with the at least one detector.

BRIEF DESCRIPTION OF THE DRAWINGS

Other aspects and advantages of the invention will become apparent upon reading the following detailed description and upon reference to the drawings in which.

DETAILED DESCRIPTION

In this invention, shielding material is disposed on a tool pad to prevent most of the radiation (e.g. gamma rays) responsible for the recess effect from reaching the detector(s) in the measurement pad. In combination with internal shielding/collimating arrangements well known in the art, the disclosed pad shielding embodiments reduce this effect to an acceptable level. As used herein, the term recess could comprise, for example, a void, indentation, chamber, opening, or it could comprise a gap formed by a suitable support structure. In fact, the term "recess" could comprise any structure which, when incorporated with a measurement pad, could produce undesired recess effects as described herein.

Figure 1A:
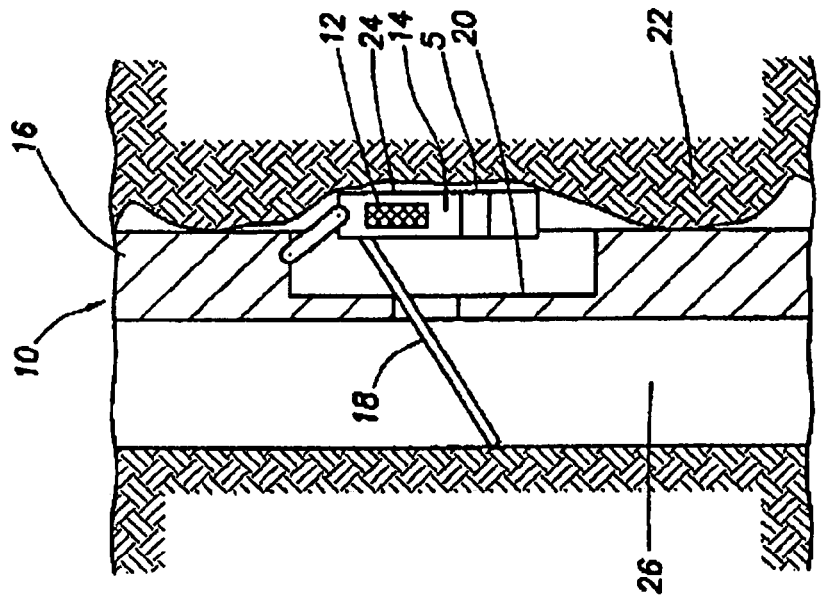
FIG. 1A is a schematic of a conventional downhole tool equipped with a pad including a nuclear source-detector assembly.
Figure 1B:
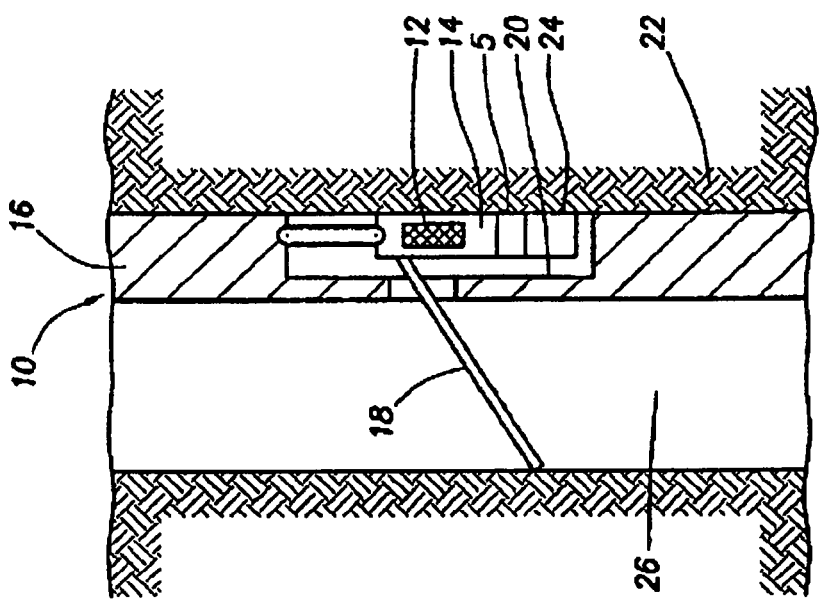
FIG. 1B is a schematic of the downhole tool of FIG. 1A showing the pad extended against the borehole wall in a subsurface formation.
Figure 2A:
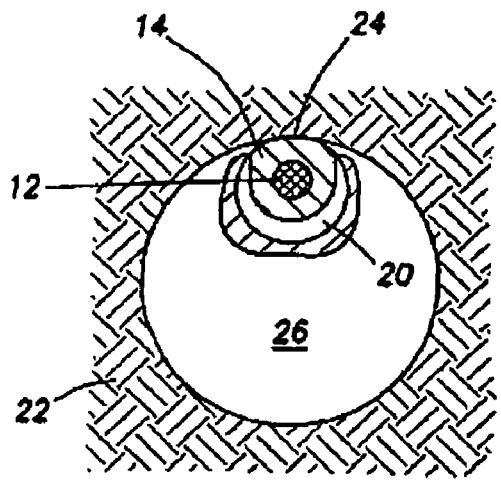
FIG. 2A is an overhead view of a conventional downhole tool with a pad disposed within a recess in the tool body.
Figure 2B:
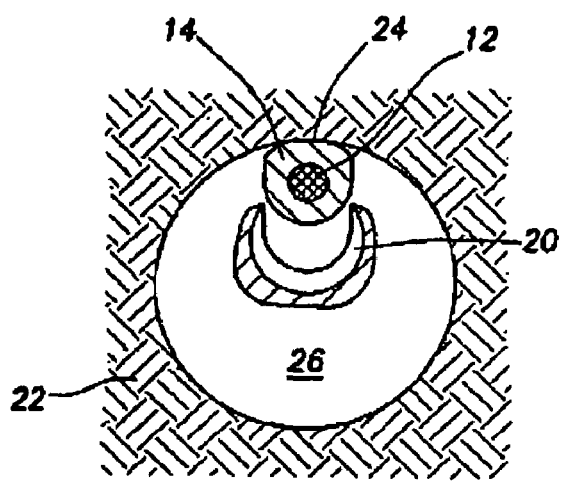
FIG. 2B is an overhead view of the tool of FIG. 2A with the pad extended away from the tool body toward a subsurface formation.
Figure 3:
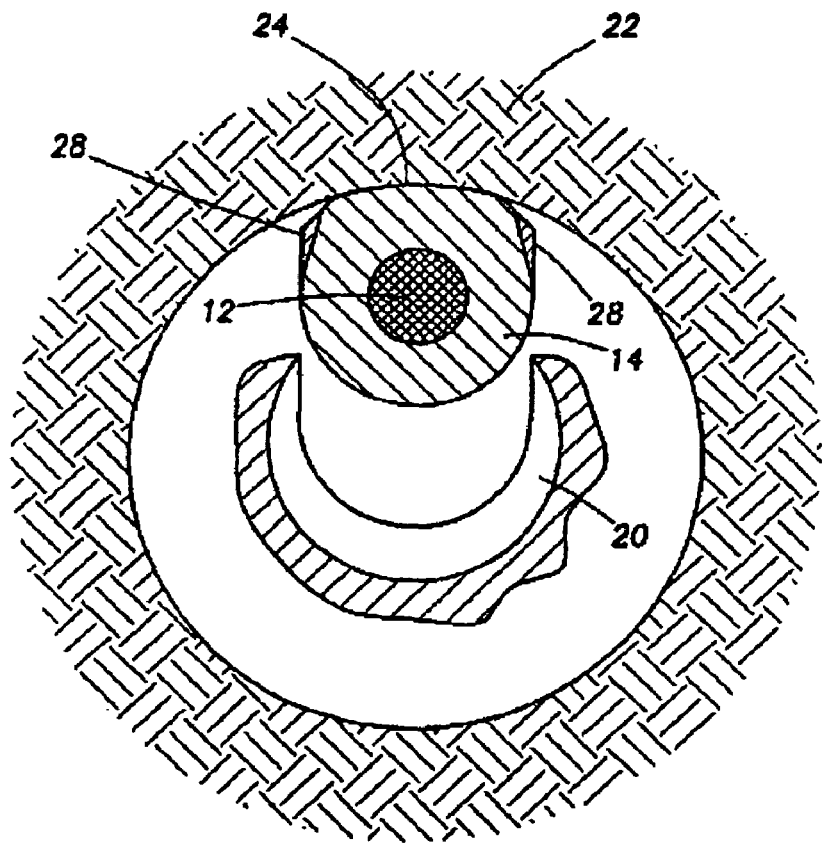
FIG. 3 is an overhead view of a nuclear source-detector pad embodiment equipped with shielding in accord with an embodiment of the invention.
Figure 4:
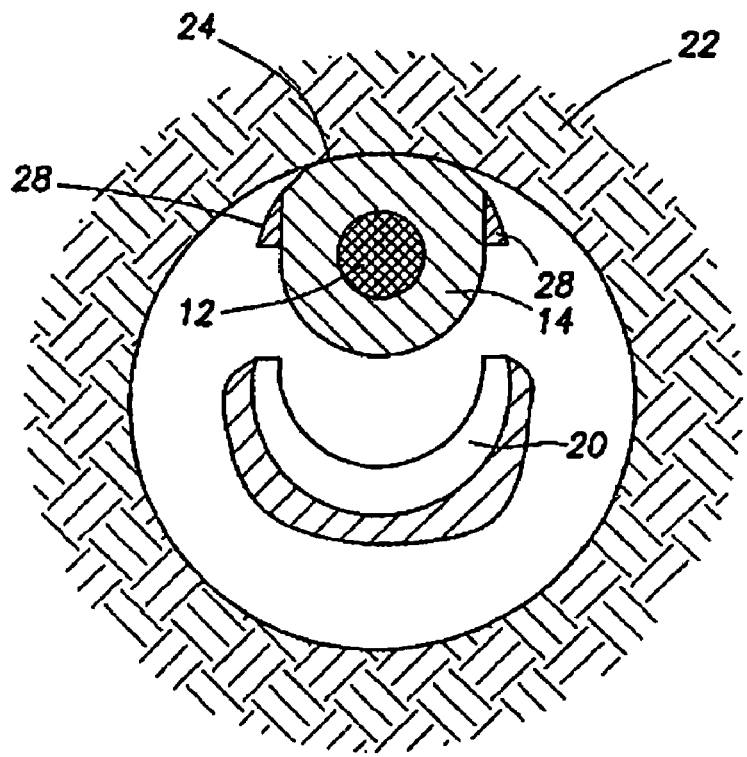
FIG. 4 is an overhead view of a nuclear source-detector pad embodiment equipped with shielding in accord with another embodiment of the invention.

FIG. 3 shows an overhead view of a pad 14 embodiment of the invention. In the interest of clarity, not all features of the tool assembly are shown in FIGS. 3 and 4. It will be understood by one of ordinary skill in the art how such apparatus are configured. Two strips of shielding material 28 are placed on the sides of the pad 14 toward the formation 22. Any suitable shielding material can be used as known in the art. A preferred shielding material has a high tungsten content and is chemically stable against corrosion from exposure to the fluids expected in a borehole. The shielding material 28 extends from the formation 22 back toward the centerline of the pad 14 so that radiation scattered off the recess 20 intercepts the shielding before reaching the frontal area of the exposed surface 24 and the housed detector 12. The shielding material 28 thus prevents undesired gamma rays, for example, from scattering into the detector 12, rendering the recess 20 effectively invisible. In some embodiments, the shielding material can also be formed of a material or combination of materials adapted to absorb radiation impinging thereon (e.g., gamma rays and/or neutrons). The shielding material 28 is most effective near the detector 12, so the shielding length along the longitudinal axis of the pad 14 may be restricted to a few centimeters above and below the detector 12 as desired.

The side shields 28 may be secured to the pad 14 by any number of suitable methods, including via fasteners, glues, epoxies, welding, and/or dovetails. Additional shielding/collimating arrangements that may be disposed on the pad 14 near the detector 12 are not shown for clarity of illustration. It will also be appreciated by those skilled in the art that embodiments of the invention may be implemented with the source disposed on the pad 14, on the tool body 16, or elsewhere in the borehole 26 as known in the art (not shown).

FIG. 4 shows another embodiment of the invention. In this embodiment, the shielding material 28 is placed on the sides of the pad 14 but still toward the formation 22. The shield material 26 is positioned so as to replace the regions of the recess 20 which would scatter radiation toward the detector 12. The shielding 28 absorbs much of the radiation. Some radiation may scatter off the side shielding 28 and reach the detector 12, but the magnitude of this signal is independent of the recess 20 position. This embodiment has slightly different physics than the one in FIG. 3, in which radiation that has already scattered off the recess 20 is absorbed or scattered before it reaches the detector 12. The change in the apparent measured radiation signal in the detector 12 as the pad 14 moves in relation to the recess 20 is thus greatly reduced. In a typical pad, calculations for the shielding configurations of the invention indicate that the sensitivity of the apparent radiation measurements (e.g. density) to the recess 20 position can be lowered by a factor of three compared to a configuration without side shielding 28.

Figure 5:
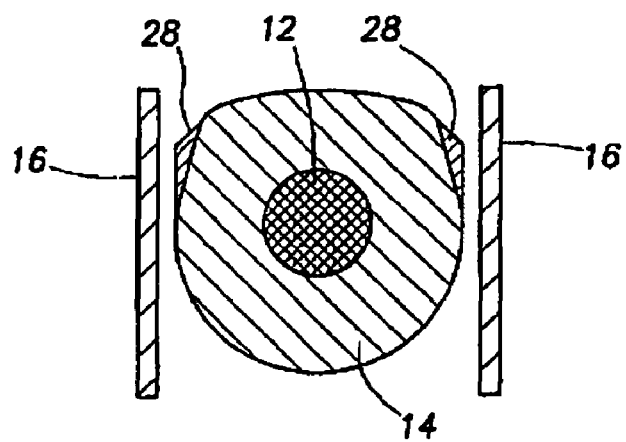
FIG. 5 is an overhead view of a shielded pad embodiment disposed in a support structure forming a recess in accord with an embodiment of the invention.

The shielding 28 configurations of the invention may comprise solid shielding material or may be constructed of other suitable materials (e.g., steel, titanium alloys, fiberglass, PEEK™) with a thin layer of shielding material disposed thereon (not shown). The latter embodiments can make fabrication of the pad 14 easier, since extrusion and welding techniques are available to form the bulk of the pad on which the shielding material may be sprayed, chemically deposited, or overlaid as a coating. As previously mentioned, a preferable shielding material 28 has a high tungsten content and is chemically stable against corrosion from exposure to borehole fluids. As in the embodiment of FIG. 3, the axial extent of the side shielding material 28 may be localized around the detector(s) 12 of interest. It will be understood that the recess 20 may be constructed from one or more support members that provide mechanical and/or electrical support for the tool body around a pad 14 and into which the pad may be recessed without necessarily having a C-shaped cross section or conforming exactly to the cross sectional shape of the pad. FIG. 5 shows a shielded pad 14 in accord with the invention disposed in a support structure implemented in a downhole tool (not shown). As shown in FIG. 5, the pad 14 can be disposed within a recess formed by a plurality of parallel support members 16.

A process for detecting subsurface radiation phenomena in accord with the disclosed shielding embodiments entails disposing an elongated support member 16 within a wellbore 26 traversing the subsurface formation 22, the support member having a recess 20 along its longitudinal axis and a pad 14 linked thereto as known in the art. The pad 14 having a surface correspondingly shaped to fit in juxtaposition with the recess 20 and a surface 24 exposed to the wellbore 26. The pad 14 having at least one radiation detector 12 disposed thereon and adapted with shielding material 28 on its sides near the exposed surface 24 to prevent radiation reflected from the recess 20 from reaching the at least one detector from the area near the exposed surface. The pad is then activated to move in and out of the recess to position the exposed pad surface within the wellbore to detect radiation phenomena with the detector.

While the techniques and apparatus of this invention have been described as specific embodiments, it will be apparent to those of ordinary skill in the art that other embodiments can be readily devised which do not depart from the scope of the invention disclosed herein. For example, since embodiments of the side shielding 28 can reside near an individual detector 12, the same technique could be applied to any number of detectors in the same pad 14. When implemented for use with gamma rays, the radiation can be produced from any source of origin. The gamma rays could originate in a chemical or electronic source (such as an X-ray generator) in the pad, natural radioactivity in the formation, or capture or inelastic scattering of neutrons. A tool with a neutron source and neutron detectors may also be implemented with the disclosed shielding 28 embodiments. In such embodiments, the side shielding 28 would be constructed from neutron shielding materials. A long list of suitable materials may be used as known in the art. Materials on this list include alloys with a high tungsten content, rubbers, rubbers loaded with neutron-absorbing elements like boron, and metal hydrides. While tungsten is a preferred high-density material for the shielding of gamma rays, other suitable materials could be used which have a high density and effective atomic number (e.g. uranium). It will also be appreciated by those skilled in the art that conventional hardware and components may be used to implement downhole tools incorporating the shielded pad embodiments of the invention.

What is claimed is:

1. An apparatus for detecting subsurface radiation phenomena, comprising:
   a support member adapted for disposal within a wellbore traversing a subsurface formation; said support member having a recess along its longitudinal axis; a pad linked to the support member, said pad having a surface correspondingly shaped to fit in juxtaposition with the recess in said support member; the pad adapted for movement into and out of said recess such that an exposed surface of said pad can extend away from said support member;
   at least one radiation detector disposed within said pad; and
   said pad having internal shielding and external shielding, wherein said external shielding material is placed substantially only on its sides near the exposed surface to prevent radiation reflected from said recess from reaching the at least one detector from the area near said exposed surface.

2. The apparatus of claim 1, wherein the shielding material extends outward from the pad exterior and runs along the longitudinal axis of the pad.

3. The apparatus of claim 2, wherein said recess forms an arcuate shaped section along the longitudinal axis of said support member.

4. The apparatus of claim 3, wherein said shielding material is formed to match the ends of said arcuate shaped recess when said pad is disposed in juxtaposition therein.

5. The apparatus of claim 4, wherein the shielding material is formed as strips affixed to the sides of said pad.

6. The apparatus of claim 3, wherein the shielding material is adapted to absorb radiation impinging thereon.

7. The apparatus of claim 6, wherein the shielding material is adapted to absorb gamma rays.

8. The apparatus of claim 6, wherein the shielding material is adapted to absorb neutrons.

9. The apparatus of claim 3, further comprising a radiation source disposed on said support member.

10. The apparatus of claim 1, further comprising a radiation source disposed on said pad.

11. The apparatus of claim 1, wherein the internal shielding comprises an internal shield partially surrounding the detector.

12. An apparatus for detecting subsurface radiation phenomena, comprising:
   an elongated support member adapted for disposal within a wellbore traversing a subsurface formation; said support member having a C-shaped recess formed along its longitudinal axis;
   a pad linked to the support member, said pad having a rounded surface correspondingly shaped to fit in juxtaposition with the C-shaped recess in said support member; the pad adapted for movement into and out of said recess such that an exposed surface of said pad can extend away from said support member; at least one radiation detector disposed within said pad; and
   said pad having internal shielding and external shielding, wherein said external shielding material is placed substantially only on its sides near the exposed surface to prevent radiation reflected from said recess from reaching the at least one detector from the area near said exposed surface.

13. The apparatus of claim 12, wherein the shielding material extends outward from the pad exterior and runs along the longitudinal axis of the pad.

14. The apparatus of claim 13, wherein the shielding material is formed as strips affixed to the sides of said pad.

15. The apparatus of claim 13, wherein the shielding material is adapted to absorb radiation impinging thereon.

16. The apparatus of claim 15, wherein the shielding material is adapted to absorb gamma rays.

17. The apparatus of claim 15, wherein the shielding material is adapted to absorb neutrons.

18. The apparatus of claim 12, wherein said shielding material is formed to match the ends of the C-shaped recess when said pad is disposed in juxtaposition therein.

19. The apparatus of claim 13, further comprising a radiation source disposed on said support member.

20. The apparatus of claim 12, further comprising a radiation source disposed on said pad.

21. The apparatus of claim 12, wherein the internal shielding comprises an internal shield partially surrounding the detector.

22. A method for detecting subsurface radiation phenomena, comprising:

disposing an elongated support member within a wellbore traversing a subsurface formation, the support member having a recess along its longitudinal axis and a pad linked thereto, said pad having a surface correspondingly shaped to fit in juxtaposition with said recess and a surface exposed to said wellbore, said pad having at least one radiation detector disposed thereon and external shielding material substantially only on its sides near the exposed surface to prevent radiation reflected from said recess from reaching the at least one detector from the area near said exposed surface;

activating the pad to move in and out of said recess to position the exposed surface of said pad within the wellbore; and detecting radiation phenomena with said at least one detector.

23. The method of claim 22, further comprising the step of disposing an internal shield partially surrounding the detector.

* * * * *